United States Patent
Grebe et al.

(10) Patent No.: US 11,055,806 B2
(45) Date of Patent: Jul. 6, 2021

(54) METHOD AND APPARATUS FOR DIRECTING APPLICATION REQUESTS FOR RENDERING

(71) Applicant: Advanced Micro Devices, Inc., Sunnyvale, CA (US)

(72) Inventors: Gregory A. Grebe, Orlando, FL (US); Jonathan Lawrence Campbell, Orlando, FL (US); Layla A. Mah, Lowell, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 259 days.

(21) Appl. No.: 15/051,952

(22) Filed: Feb. 24, 2016

(65) Prior Publication Data

US 2016/0253774 A1    Sep. 1, 2016

Related U.S. Application Data

(60) Provisional application No. 62/121,968, filed on Feb. 27, 2015.

(51) Int. Cl.
*G06T 15/00*    (2011.01)
*G06T 1/20*    (2006.01)

(52) U.S. Cl.
CPC ..................... *G06T 1/20* (2013.01)

(58) Field of Classification Search
CPC .......... G06T 15/005; G06T 1/20; G09G 5/363
USPC .......................................... 345/522, 502–505
See application file for complete search history.

(56) References Cited

U.S. PATENT DOCUMENTS

| | | | |
|---|---|---|---|
| 2007/0103590 A1* | 5/2007 | Azar | G06F 3/14 348/459 |
| 2012/0001925 A1* | 1/2012 | Andonieh | G06F 9/5083 345/502 |
| 2014/0204102 A1* | 7/2014 | Rath | G06T 1/20 345/522 |

* cited by examiner

*Primary Examiner* — Yi Yang
(74) *Attorney, Agent, or Firm* — Volpe Koenig (57) ABSTRACT

A method and system for directing image rendering, implemented in a computer system including a plurality of processors includes determining one or more processors in the system on which to execute one or more commands. A graphics processing unit (GPU) control application program interface (API) determines one or more processors in the system on which to execute one or more commands. A signal is transmitted to each of the one or more processors indicating which of the one or more commands are to be executed by that processor. The one or more processors execute their respective command. A request is transmitted to each of the one or more processors to transfer information to one another once processing is complete, and an image is rendered based upon the processed information by at least one processor and the received transferred information from at least another processor.

19 Claims, 6 Drawing Sheets

METHOD AND APPARATUS FOR DIRECTING APPLICATION REQUESTS FOR RENDERING

CROSS REFERENCE TO RELATED APPLICATIONS

This Application claims the benefit of U.S. Provisional Application Ser. No. 62/121,968, filed on Feb. 27, 2015, the contents of which are incorporated by reference herein.

FIELD OF THE INVENTION

The present invention is generally directed to application requests, and more particularly, to a method and apparatus for directing application requests for rendering.

BACKGROUND

Figure 1:
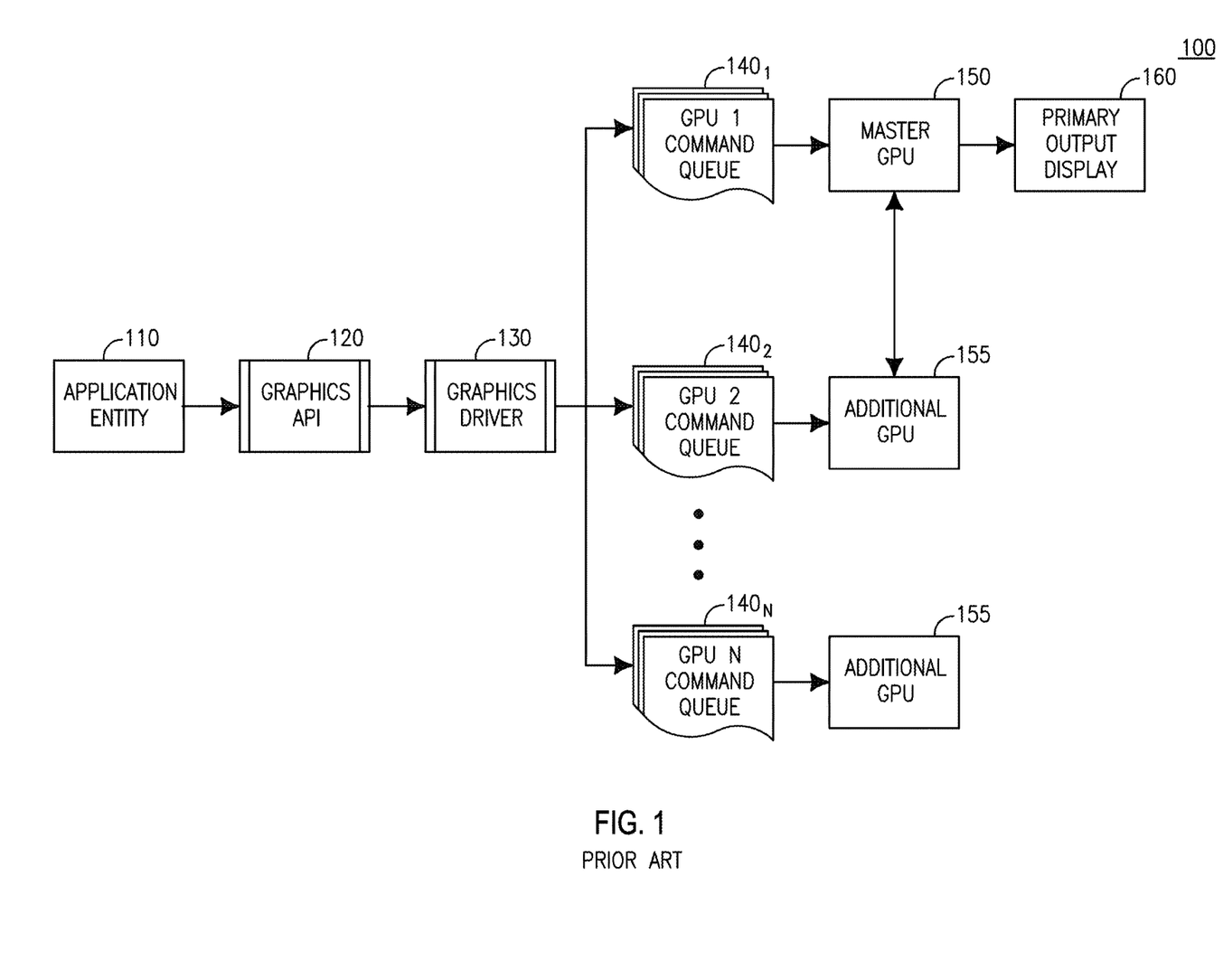
FIG. 1 is a block diagram of an example conventional linked display adapter.

Computing systems may include more than one graphics processing unit (GPU). Conventional systems utilize additional GPUs through a graphics application program interface (API) as a single stream command. FIG. 1 is a block diagram of an example conventional linked display adapter 100. The adapter 100 includes an application entity 110, which may provide one or more application draw commands, a graphics API 120, a graphics driver 130, a plurality of GPU command queues 140, (designated $140_1$, $140_2$ ... $140_N$), a master GPU 150, a plurality of additional GPUs 155, and a primary output display device 160. The application draw commands may be in a sequence and specific to an API, while not being specific to a particular GPU. Additionally, the application draw commands may include ordered steps for a GPU to perform a repeatable set of calculations, (e.g., production of an output image from input geometry).

In operation, the adapter 100 includes the application draw commands 110 submitted to the graphics API 120 as a single stream. The graphics API 120 relays the command to the graphics driver 130, which submits the commands to the GPU command queues 140. The queue, or queues, 140 that receives the command is selected by the graphics driver 130. Each GPU 150 or 155 extracts its command from its respective command queue 140, and displays the results of the command on the display 160. Information may also be transferred between GPUs, (e.g., between GPU 150 and one or more GPUs 155 as shown). Frames may also be alternately rendered. For example, a first frame might be sent to the master GPU 150, while a second frame is sent to the additional GPU 155 for rendering, with each subsequent frame alternating rendering between the two GPUs.

However, there is no conventional method for directing by an application which GPU is to render a command, for example, in virtual reality (VR) rendering. It would therefore be beneficial to provide a method and apparatus for directing application requests for rendering.

SUMMARY OF EMBODIMENTS

A method for directing image rendering, implemented in a computer system including a plurality of processors is disclosed. The method includes determining, by a graphics processing unit (GPU) control application program interface (API), one or more processors in the system on which to execute one or more commands. A signal is transmitted to each of the one or more processors indicating which of the one or more commands are to be executed by that processor. The one or more processors execute their respective command. A request is transmitted to each of the one or more processors to transfer information to one another once processing is complete, and an image is rendered based upon the processed information by at least one processor and the received transferred information from at least another processor.

A system including a first processor in communication with an application entity, a second processor in communication with the application entity, and a display in communication with the first processor is disclosed. The first processor is configured to receive a first command from the application entity indicating that the first processor is to execute the first command. The second processor is configured to receive a second command from the application entity indicating that the second processor is to execute the second command and a third command from the application entity that the second processor is to transfer information to the first processor upon completion of execution of the second command. The first processor is further configured to render an image to the display based upon the processed command by the first processor and the received transferred information from the second processor.

A non-transitory computer readable storage medium is disclosed. The non-transitory computer readable storage medium has instructions recorded thereon that, when executed by a computing device, cause the computing device to perform operations including: determining, by a graphics processing unit (GPU) control application program interface (API), one or more processors in the system on which to execute one or more commands, transmitting a signal to each of the one or more processors indicating which of the one or more commands are to be executed by that processor, executing, by the one or more processors, their respective command, transmitting a request to each of the one or more processors to transfer information to one another once processing is complete, and rendering an image based upon the processed information by at least one processor and the received transferred information from at least another processor

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Although a more detailed description is provided below, briefly a method and apparatus are described for directing application requests for rendering. GPUs are selected for performing processing in accordance with application commands.

Figure 2:
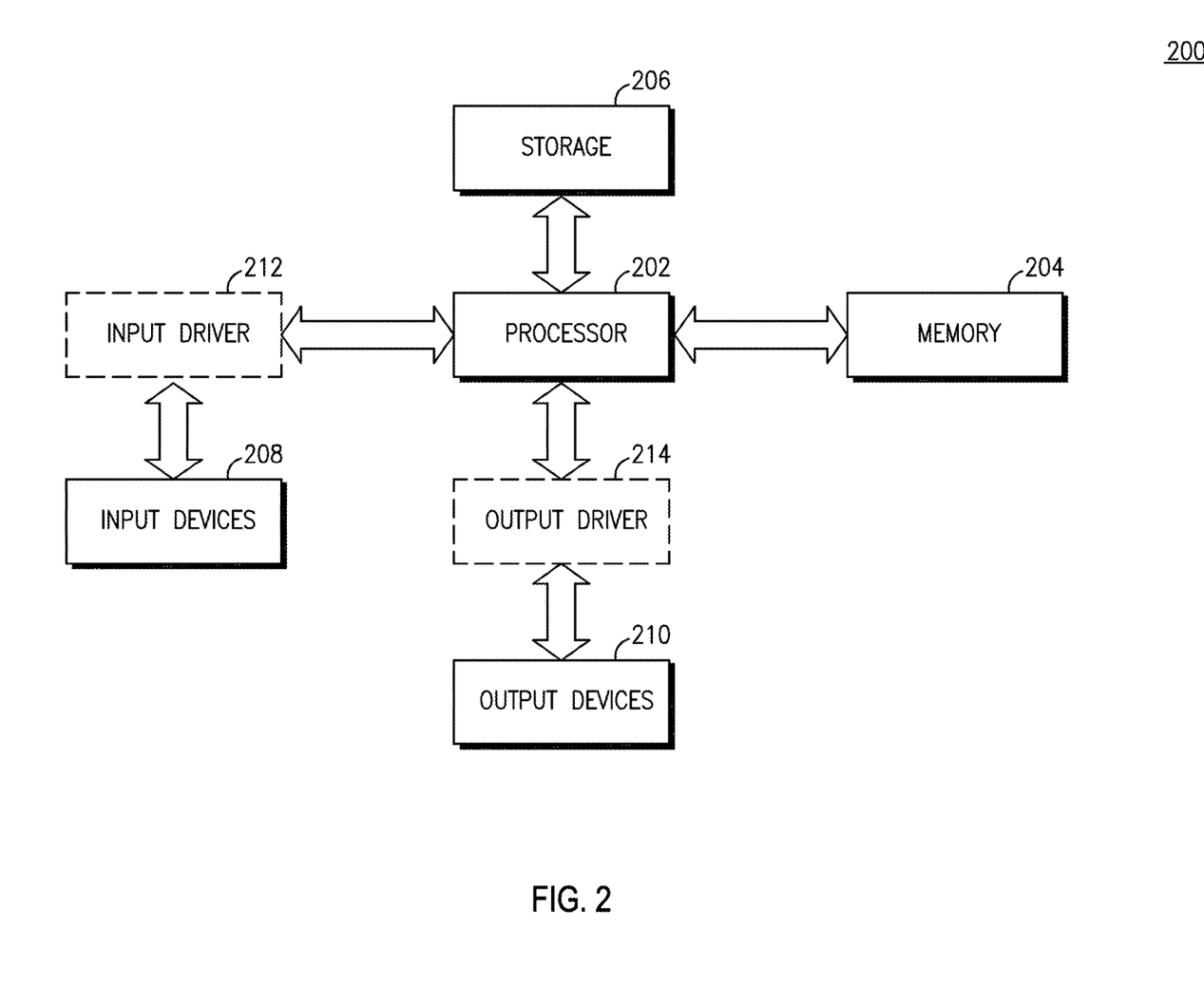
FIG. 2 is a block diagram of an example device in which one or more disclosed methods may be implemented.

FIG. 2 is a block diagram of an example device 200 in which one or more disclosed embodiments may be implemented. The device 200 may include a computer, for example, a desktop computer, a tablet computer, a gaming device, a handheld device, a set-top box, a television, or a mobile phone. The device 200 includes a processor 202, a memory 204, a storage 206, one or more input devices 208, and one or more output devices 210. The device 200 may also optionally include an input driver 212 and an output driver 214. It is understood that the device 200 may include additional components not shown in FIG. 2.

The processor 202 may include a central processing unit (CPU), a graphics processing unit (GPU), a CPU and GPU located on the same die, or one or more processor cores, wherein each processor core may be a CPU or a GPU. The memory 204 may be located on the same die as the processor 202, or may be located separately from the processor 202. The memory 204 may include a volatile or non-volatile memory, for example, random access memory (RAM), dynamic RAM, or a cache.

The storage 206 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 212 communicates with the processor 202 and the input devices 208, and permits the processor 202 to receive input from the input devices 208. The output driver 214 communicates with the processor 202 and the output devices 210, and permits the processor 202 to send output to the output devices 210. It is noted that the input driver 212 and the output driver 214 are optional components, and that the device 200 will operate in the same manner if the input driver 212 and the output driver 214 are not present. Although described embodiments include a main display, the invention may be practiced without a main display, and only include a source device of video. In this way, the control territory may be an office environment with a plurality of portable devices and no main display.

Figure 3:
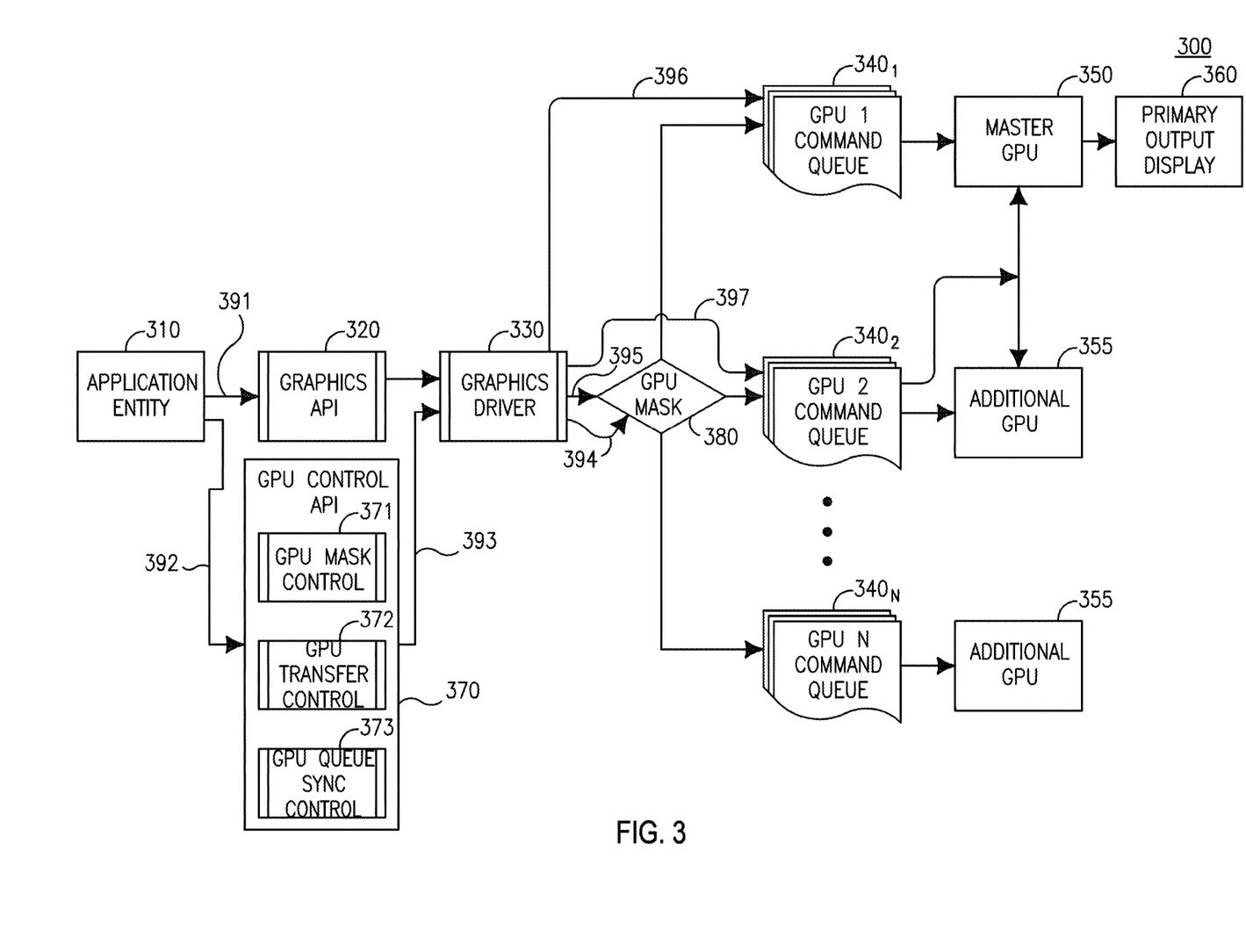
FIG. 3 is a block diagram of an example display adapter.

FIG. 3 is a block diagram of an example display adapter 300. The adapter 300 includes an application entity 310, which may provide one or more application draw commands, a graphics API 320, a graphics driver 330, a plurality of GPU command queues 340, (designated $340_1$, $340_2$ ... $340_N$), a master GPU 350, a plurality of additional GPUs 355, a primary output display device 360, a GPU Control API 370, and a GPU Mask device 380. The GPU Control API 370 includes a GPU Mask Control 371, a GPU Transfer Control 372 and a GPU Queue Sync Control 373.

A method for directing application requests is described with reference to the signaling depicted in example display adapter 300 of FIG. 3. The application entity 310 submits commands to the graphics API 320 (391), which are passed along to the Graphics Driver 330. The application also submits request for GPU control through the GPU Control API 370 (392). For example, to control command redirections to a particular GPU, the GPU Mask Control 371 may be utilized. To control information transfer between GPUs, the GPU Transfer Control 372 may be utilized. To control queue execution barriers to synchronize between GPU queues, the GPU Queue Sync Control 373 may be utilized.

Once the control commands are received by the GPU Control API 370, it issues commands to the Graphics Driver 330 (393). The Graphics Driver 330 issues GPU mask commands, (i.e., to control command redirections to GPUs), to the GPU Mask 380 to adjust the GPU mask value (394). That is, the GPU mask commands instruct the GPU Mask 380 which GPUs are to execute specific commands, which the GPU Mask 380 passes on to the GPU Command Queues 340. Graphics commands are sent to the GPU Mask 380 by the Graphics Driver 330 (395) for redirection to specific GPU Command Queues 340. In this manner, the GPU mask 380 may operate as a switching device that is controlled by the commands in the command stream or sequence that it receives to ensure operations occur in order.

The Graphics Driver issues GPU Queue Sync commands to the GPU Command Queues 340 (396). Although signal 396 is shown as being transmitted to GPU1 Command Queue $340_1$, all GPU Command Queues 340 are synchronized by the command. That is, synchronization events are introduced into the GPU Queues 340 via the GPU Queue Sync Control 373. Effectively, to ensure proper functionality, the execution of one GPU queue relative to another may be stopped and started. Although GPUs may operate asynchronously, the operations performed on them may be ordered. For example, in a virtual reality (VR) example, a GPU connected to an output display waits for the transfer of data from a second GPU before being allowed to present the final combined image to the output display. Additionally, the Graphics Driver 330 may issue GPU transfer commands, (e.g., via the GPU Transfer Control 372), to specific GPU Queues requesting information be transferred between GPUs (396). In the example shown in FIG. 3, the transfer commands are being shown as directed to GPU1 Command Queue $340_1$, but the commands could be issued to any GPU Command Queue 340. These commands allow, for example, the master GPU 350 to share information with the one or more of the additional GPUs and its command queue, as shown in FIG. 3. The resultant data is then displayed on display 360.

Figure 4A:
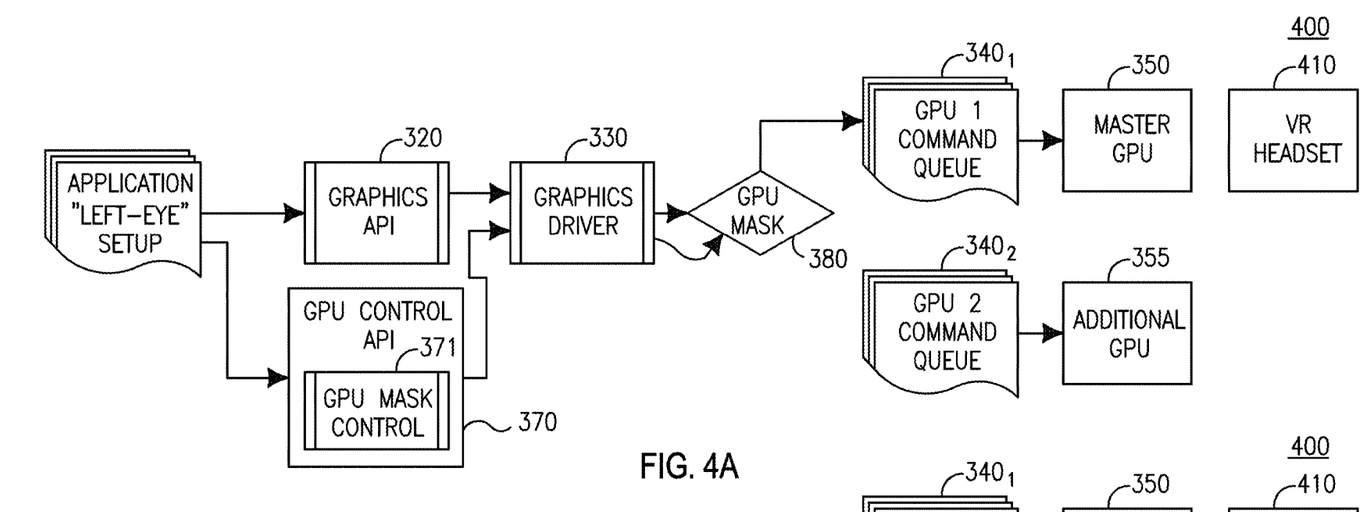
FIGS. 4A-4E depict an example method of performing virtual reality (VR) rendering.
Figure 4B:
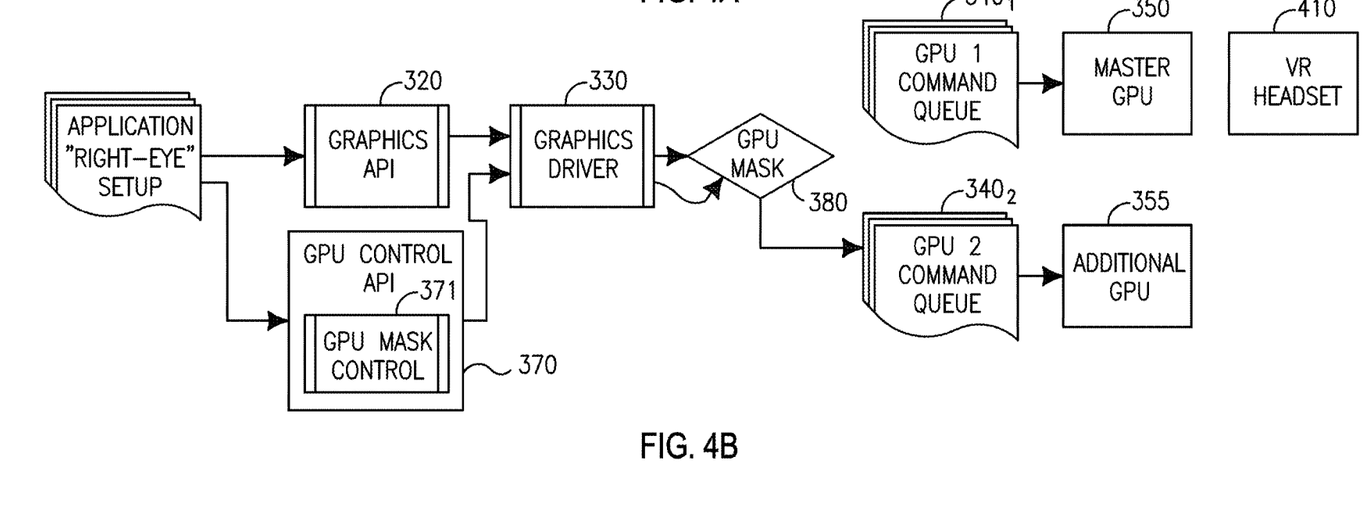
Figure 4C:
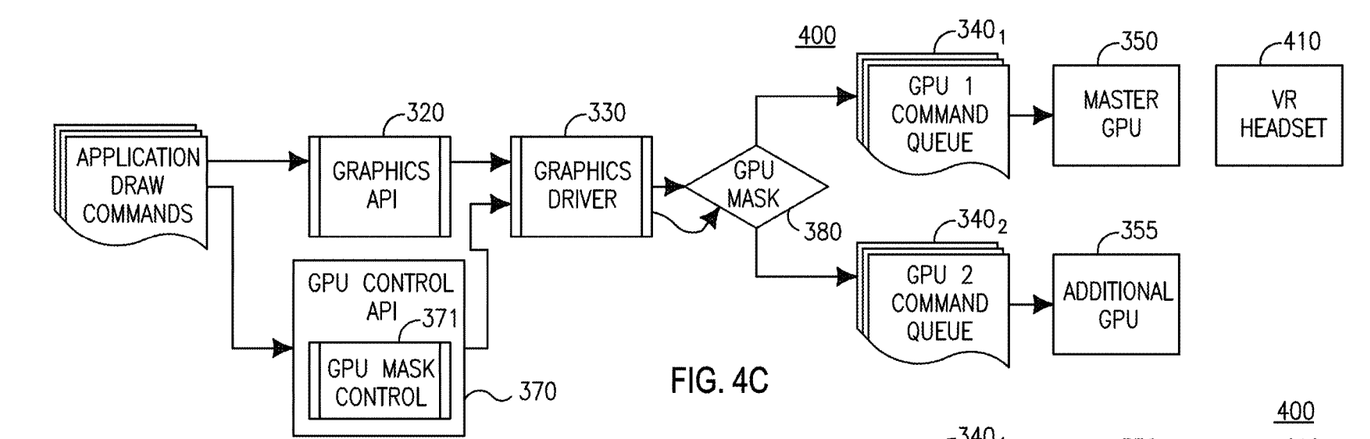

FIGS. 4A-4E depict an example method 400 of performing VR rendering. FIGS. 4A-4E depict an adapter substantially similar to the one described above in FIG. 3, and similar components are denoted with similar reference numerals to those depicted in FIG. 3. Additionally, the method shown in FIG. 4 includes a VR Headset 410 for displaying the renderings. In FIG. 4A, an application directs all set up commands for a "left eye" rendering utilizing the GPU Mask Control 371 to the master GPU 350. In FIG. 4B, an application directs all set up commands for a "right eye" rendering utilizing the GPU Mask Control 371 to an additional GPU 355, (e.g., associated with GPU Command Queue $340_2$). FIG. 4C shows normal draw commands being directed to both GPUs set up in FIGS. 4A and 4B via the GPU Mask Control 371. That is, the mask control is "set" to both GPUs 350 and 355 by the application. This setting may include setting a bit to "1" when a GPU is to be utilized and "0" when a GPU is not to be utilized.

Figure 4D:
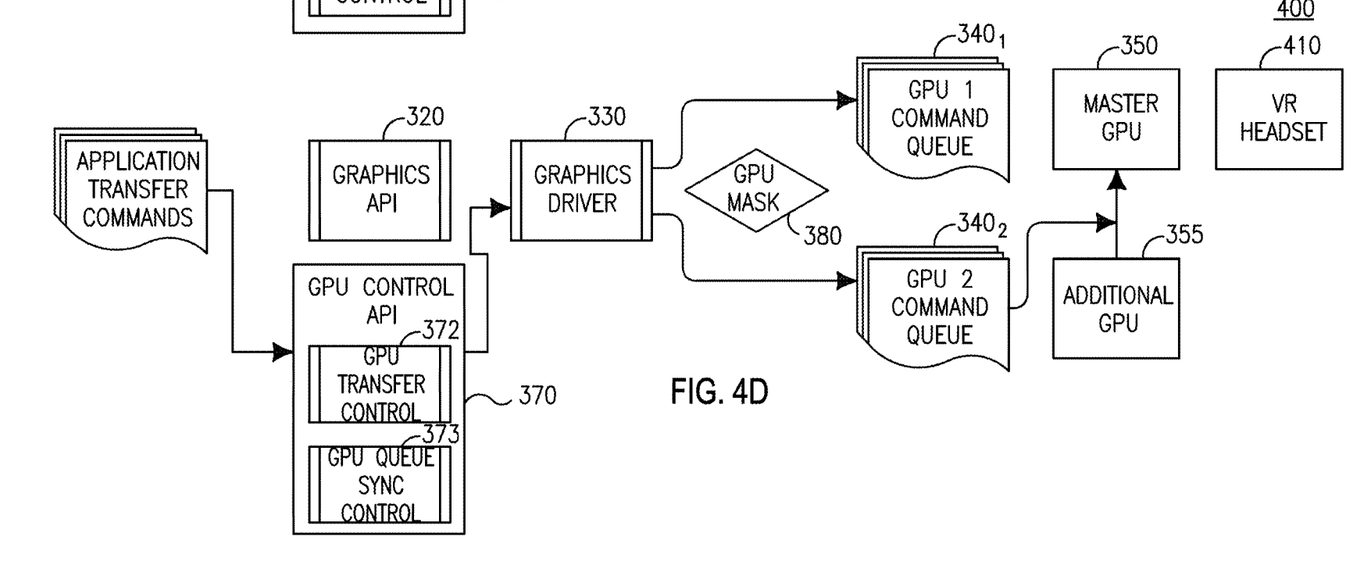
Figure 4E:
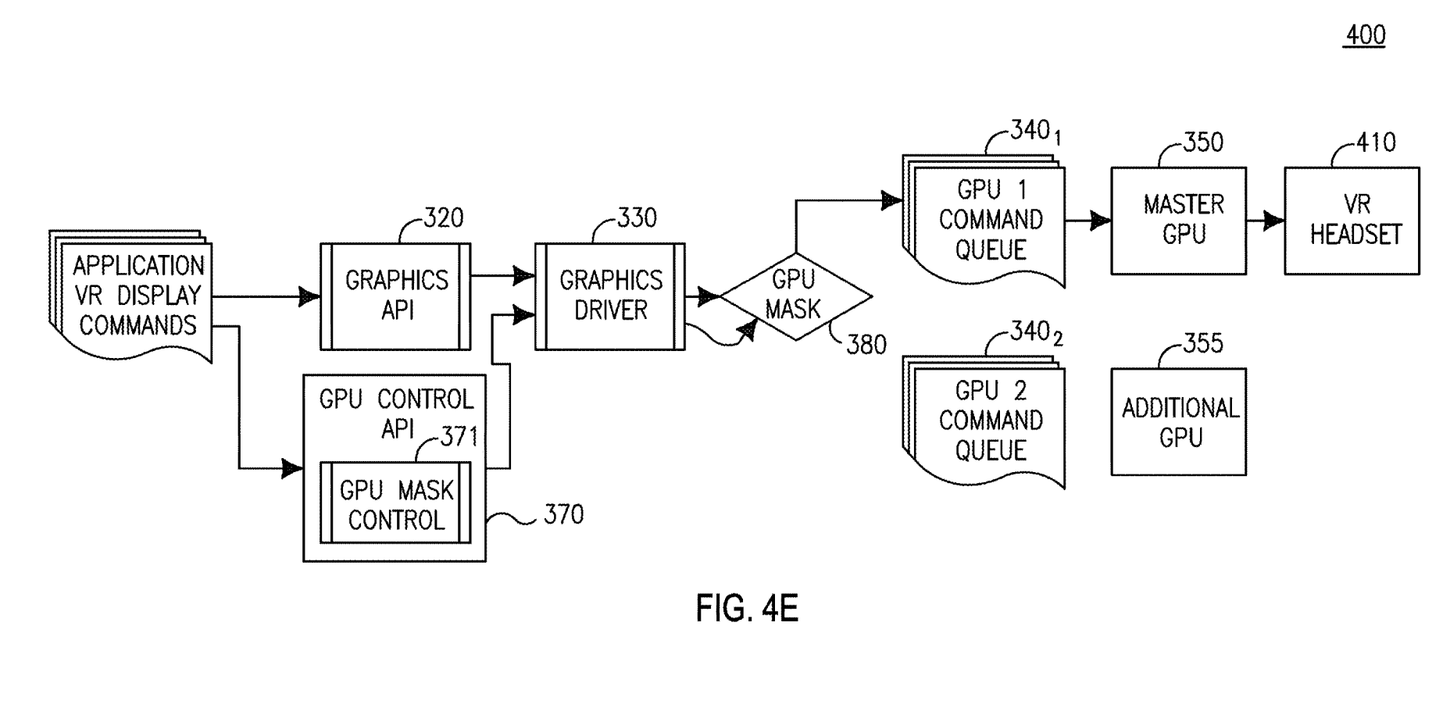

In FIG. 4D, the application request a transfer of "right eye" information from GPU 355 to GPU 350, and requests GPU 350 wait for the information. This is performed via the GPU Transfer Control 372 and GPU Queue Sync Control 373. That is, the GPU Transfer Control 372 directs GPU 355 to transfer information to GPU 350, while the GPU Queue Sync Control 373 directs GPU 350 to wait for completion of the transfer prior to executing commands submitted after the transfer request was issued. Alternatively, the GPU 350 could be directed to delay the wait until just prior to the result of the transferred data being utilized. In this case, the wait for the transfer may already be complete before the wait for completion would be executed, shortening or removing the wait time from the execution order. In FIG. 4E, the application sets the GPU mask to the master GPU 350 via the GPU Mask Control 371 to direct the GPU 350 to render the composite image, (e.g., left and right eye renderings), to the VR Headset 410. It should be understood that many variations are possible based on the disclosure herein. Although features and elements are described above in particular combinations, each feature or element may be used alone without the other features and elements or in various combinations with or without other features and elements.

For example, the above method and devices may include multiple GPU Command Queues (340) direct to a single GPU (either 350 or 355). In this case, the command queues may be executed in an unspecified order relative to each other while maintaining a sequence within the same queue. Since the GPU Queue Sync Control (373) controls the starting and stopping of queues (340) relative to each other, any mandatory ordering or sequence of commands between two or more queues could be ensured even on a single GPU.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for providing efficient display rendering, implemented in a computer system including a display adapter including a plurality of processors, comprising:
   determining, by a graphics processing unit (GPU) control application program interface (API) of the display adapter in communication with each of the processors of the plurality of processors, one or more processors in the system on which to execute one or more commands upon receipt of a control request for executing display rendering;
   transmitting, by a GPU mask control through the GPU control API, a signal to a GPU mask device that is operatively coupled to each of the one or more processors indicating which of the one or more commands are to be executed by that processor;
   forwarding, by the GPU mask device, respective commands of the one or more commands to the respective one or more processors indicated to execute their respective commands;
   executing, by the one or more processors, their respective command;
   transmitting, by a GPU transfer control through the GPU control API, a request to the GPU mask device for each of the one or more processors to transfer information to one another once processing is complete;
   forwarding, by the GPU mask device, the request to transfer information to the respective one or more processors;
   transmitting, by a GPU queue synch control through the GPU control API, a synch command to the GPU mask device, the synch command indicating at least one processor of the one or more processors is to synchronize rendering of an image based upon receiving the transferred information from another processor;
   forwarding, by the GPU mask device, the synch command to the respective at least one processor; and
   rendering, by the at least one processor to a display, based upon a respective command received from the GPU mask device, an image based upon the processed information by that processor and the received transferred information from at least another processor received by the at least one processor when the at least one processor receives the transferred information.

2. The method of claim 1 wherein the plurality of processors include a plurality of GPUs.

3. The method of claim 1 wherein the determining includes determining that a first command is to be processed by a first processor and a second command is to be processed by a second processor.

4. The method of claim 3 wherein the first processor renders the image based upon the processed information and receives the transferred information from the second processor.

5. The method of claim 4, further comprising instructing the first processor to delay executing the first command until receiving the transferred information from the second processor.

6. The method of claim 5 wherein the instructing the first processor to delay executing the first command until receiving the transferred information from the second processor is included in the synch command.

7. The method of claim 1 wherein the signal indicating which of the one or more commands are to be executed by that processor is a GPU mask command.

8. The method of claim 1 wherein the transmitting the request to each of the one or more processors to transfer information to one another includes sending a GPU transfer command to the processor being directed to transfer its information.

9. A display system for providing efficient display rendering, comprising:
   a first processor operatively coupled with and in communication with a graphics processing unit (GPU) mask device;
   a display in communication with the first processor;
   a second processor operatively coupled with and in communication with the GPU mask device; and
   a GPU control application program interface (API) operatively coupled with and in communication with the GPU mask device,
   wherein the GPU API receives a control request for executing display rendering, and a GPU mask control sends through the GPU API a first command to the GPU mask device and the GPU mask device forwards the first command to the first processor indicating that the first processor is to execute the first command, wherein the GPU mask control sends through the GPU API a second command to the GPU mask device and the GPU mask device forwards the second command to the second processor indicating that the second processor is to execute the second command, wherein a GPU transfer control sends through the GPU API a transfer command to the GPU mask device and the GPU mask device forwards the transfer command to the second processor indicating that the second processor is to transfer information to the first processor upon completion of execution of the second command, wherein a GPU queue synch control sends through the GPU API a synch command to the GPU mask device and the GPU mask device forwards the synch command to the first processor indicating the first processor is to synchronize rendering of an image based upon receiving the transferred information from the second processor, and wherein when the first processor receives the transferred information from the second processor the first processor renders the image to the display based upon the processed commands by the first processor and the received transferred information from the second processor.

10. The display system of claim 9 wherein the GPU API that determines the command to execute on the first processor and the command to execute on the second processor.

11. The display system of claim 10, wherein the GPU mask device transmits a signal to the first processor instructing the first processor to delay executing the first command until receiving the transferred information from the second processor.

12. The display system of claim 11 wherein the instructing the first processor to delay executing the first command until receiving the transferred information from the second processor is included in the synch command.

13. The display system of claim 10 wherein the first command and the second command are GPU mask commands.

14. A non-transitory computer readable storage medium, having instructions recorded thereon that, when executed by a computing device, cause the computing device to perform operations comprising:

determining, by a graphics processing unit (GPU) control application program interface (API) of the display adapter in communication with each of the processors of the plurality of processors, one or more processors in the system on which to execute one or more commands upon receipt of a control request for executing display rendering;

transmitting, by a GPU mask control through the GPU control API, a signal to a GPU mask device that is operatively coupled to each of the one or more processors indicating which of the one or more commands are to be executed by that processor;

forwarding, by the GPU mask device, respective commands of the one or more commands to the respective one or more processors indicated to execute their respective commands;

executing, by the one or more processors, their respective command;

transmitting, by a GPU transfer control through the GPU control API, a request to the GPU mask device for each of the one or more processors to transfer information to one another once processing is complete;

forwarding, by the GPU mask device, the request to transfer information to the respective one or more processors;

transmitting, by a GPU queue synch control through the GPU control API, a synch command to the GPU mask device, the synch command indicating at least one processor of the one or more processors is to synchronize rendering of an image based upon receiving the transferred information from another processor;

forwarding, by the GPU mask device, the synch command to the respective at least one processor;

rendering, by the at least one processor to a display, based upon a respective command received from the GPU mask device, an image based upon the processed information by that processor and the received transferred information from at least another processor received by the at least one processor when the at least one processor receives the transferred information.

15. The non-transitory computer readable storage medium of claim 14 wherein the determining includes determining that a first command is to be processed by a first processor and a second command is to be processed by a second processor.

16. The non-transitory computer readable storage medium of claim 15 wherein the first processor renders the image based upon the processed information and receives the transferred information from the second processor.

17. The non-transitory computer readable storage medium of claim 16, further comprising instructing the first processor to delay executing the first command until receiving the transferred information from the second processor.

18. The non-transitory computer readable storage medium of claim 17 wherein the instructing the first processor to delay executing the first command until receiving the transferred information from the second processor includes transmitting a GPU sync command.

19. The non-transitory computer readable storage medium of claim 14 wherein the signal indicating which of the one or more commands are to be executed by that processor is a GPU mask command.

\* \* \* \* \*